(12) United States Patent
Krenzer et al.

(10) Patent No.: US 9,862,036 B2
(45) Date of Patent: Jan. 9, 2018

(54) DRILL BIT

(71) Applicant: Mapal Fabrik für Präzisionswerkzeuge Dr. Kress KG, Aalen (DE)

(72) Inventors: Ulrich Krenzer, Zirndorf (DE); Serkan Topal, Altenstadt (DE)

(73) Assignee: MAPAL FABRIK FUR PRAZISIONSWERKZEUGE DR. KRESS KG, Aalen (DE)

( * ) Notice: Subject to any disclaimer, the term of this patent is extended or adjusted under 35 U.S.C. 154(b) by 0 days.

(21) Appl. No.: 14/915,314

(22) PCT Filed: Aug. 25, 2014

(86) PCT No.: PCT/EP2014/068005
§ 371 (c)(1),
(2) Date: Feb. 29, 2016

(87) PCT Pub. No.: WO2015/028431
PCT Pub. Date: Mar. 5, 2015

(65) Prior Publication Data
US 2016/0214184 A1    Jul. 28, 2016

(30) Foreign Application Priority Data

Aug. 30, 2013  (DE) .................. 10 2013 014 624
Dec. 19, 2013  (DE) .................. 10 2013 226 697

(51) Int. Cl.
*B23B 51/02*    (2006.01)

(52) U.S. Cl.
CPC .......... *B23B 51/02* (2013.01); *B23B 2250/12* (2013.01); *B23B 2251/04* (2013.01);
(Continued)

(58) Field of Classification Search
CPC ................ B23B 51/02; B23B 2251/14; B23B 2251/202; B23B 2251/18; Y10T 408/9097; Y10T 408/909
See application file for complete search history.

(56) References Cited

U.S. PATENT DOCUMENTS 6,309,149 B1 * 10/2001 Borschert .............. B23B 51/02
408/1 R
7,018,143 B2 * 3/2006 Moore .................. B23B 51/009
408/211

(Continued)

FOREIGN PATENT DOCUMENTS

DE    102007037911 A1    4/2008
DE    102009025223 A1   12/2010
(Continued)

OTHER PUBLICATIONS

English translaton of International Preliminary Report on Patentability and Written Opinion of the International Searching Authority regarding Application No. PCT/EP2014/068005, dated Mar. 1, 2016.
(Continued)

*Primary Examiner* — Daniel Howell
*Assistant Examiner* — Chwen-Wei Su
(74) *Attorney, Agent, or Firm* — Stephen T. Olson; Harness, Dickey & Pierce, P.L.C.

(57) ABSTRACT

A drill has a central axis, a front side, a circumferential surface, at least two main edges on the front side, which reach up to the circumferential surface and merge there with secondary edges, at least two central edges extending from the end of the main edge facing away from the circumferential surface, cutting surfaces associated with the main edges and central edges, chip flutes associated with the main edges and central edges and introduced into the circumferential surface, at least one cross edge adjoined by the ends
(Continued)

of the central edges facing away from the main edges which passes through the central axis, a point thinning and chip run-up shoulders associated with at least the cutting surfaces of the central edges. An angle $\gamma$ of the chip run-up shoulder decreases in the region of the point thinning towards the central axis as the distance from the front side increases.

16 Claims, 5 Drawing Sheets

(52) U.S. Cl.
CPC ....... *B23B 2251/14* (2013.01); *B23B 2251/18* (2013.01); *Y10T 408/909* (2015.01); *Y10T 408/9097* (2015.01)

(56) References Cited

U.S. PATENT DOCUMENTS

| | | |
|---|---|---|
| 7,789,599 B2 | 9/2010 | Takikawa |
| 8,801,344 B2 | 8/2014 | Krenzer et al. |
| 2003/0002941 A1* | 1/2003 | Borschert ............... B23B 51/02 408/230 |
| 2003/0039522 A1* | 2/2003 | Yanagida ................ B23B 51/02 408/230 |
| 2008/0089753 A1 | 4/2008 | Takikawa |
| 2009/0279965 A1* | 11/2009 | Soittu ..................... B23B 51/02 408/59 |
| 2012/0076597 A1 | 3/2012 | Krenzer et al. |
| 2012/0201619 A1* | 8/2012 | Olsson ................... B23B 51/02 408/230 |
| 2013/0045058 A1 | 2/2013 | Schwaegerl |

FOREIGN PATENT DOCUMENTS

| | | |
|---|---|---|
| DE | 102010006797 A1 | 8/2011 |
| JP | 2001079707 A * | 3/2001 |

OTHER PUBLICATIONS

International Search Report for PCT/EP2014/068005, ISA/EP, Rijswijk, NL, dated Oct. 29, 2014.
Written Opinion of the ISA for PCT/EP2014/068005, ISA/EP, Rijswijk, NL, dated Oct. 29, 2014.

* cited by examiner

DRILL BIT

CROSS-REFERENCE TO RELATED APPLICATIONS

This application is a 371 U.S. National Stage of International Application No. PCT/EP2014/068005, filed on Aug. 25, 2014, which claims the benefit of and priority to German Patent Applications DE 10 2013 014 624.0, filed on Aug. 30, 2013 and DE 10 2013 226 697.9, filed on Dec. 19, 2013. The entire disclosures of the above applications are incorporated herein by reference.

FIELD

The invention relates to a drill.

BACKGROUND

Drills of the type addressed here are known. Usually, in particular solid carbide drills and high performance drills from high-speed steel (HSS) with a relatively large core diameter of 25 to 35% of the drill diameter are used. In the case of such a large core diameter it is necessary to shorten the cross edge of the drill that connects the main edges thereof by means of a point thinning. This measure is known. In particular when processing very soft materials such as for example aluminium it often occurs that a built-up edge forms in the region of the point thinning of the drill due to the high friction between the chips removed by the drill and the cutting surfaces of the drill. These built-up edges increase on the one hand the cutting pressure of the drill, on the other hand they reduce the positional accuracy of the bores, because a drill with built-up edges has a more or less undefined edge geometry and is pushed out of the rotary axis in particular during the start of the drilling process. In double-edged drills, the formation of built-up edges can often be reduced by a generously sized and polish-ground point thinning, so that the chips can be carried off with low friction. In the case of long-chipping materials, an excessively generous point thinning has however disadvantages in respect of chip breaking, because the interaction of the main edge, the point thinning and the shape of the chip flutes determines the shape of the chips. Since the overall edge length is determined by the length of the main edge and the length of the point thinning, the width of the chip is in principle greater than the depth of the chip flute. This means that a secure chip removal through the chip flutes defining the chip space can be ensured only if the chips are formed in such a way that they can easily pass through the chip flutes due to their size. It has also been shown that chip forming causes high friction forces and thus also high temperatures to occur at the drill tip. When processing high-strength materials, crater wear, i.e. crater formation on the chip surface, and edge breakouts are frequently the result of a poor running off of chips.

SUMMARY

It is therefore the object of the invention to provide a drill wherein chip removal is improved.

In order to achieve this object, a drill is proposed that has a central axis, a front side, a circumferential surface, at least two main edges provided on the front side, which reach up to the circumferential surface and merge there with associated secondary edges, at least two central edges that follow on from the end of the main edges that faces away from the circumferential surface, cutting surfaces associated with the at least two main edges and the at least two central edges, at least one cross edge that is adjoined by the ends of the at least two central edges that face away from the at least two main edges and that passes through the central axis, cutting surfaces that are associated with the at least two main edges as well as the at least two central edges and are inserted into the circumferential surface, a point thinning and chip run-up shoulders associated with the cutting surfaces. The drill according to the invention is characterised in that in the region of the point thinning, the chip run-up shoulder has an axial angle .gamma. measured in relation to the central axis, which angle decreases, preferably continuously, as the distance from the front side increases. The axial angle mentioned here can be seen particularly well in a lateral view of the drill.

This embodiment ensures that chips formed during the use of the drill are optimally removed, and the frictional forces developing during chip formation and thus also the temperatures associated therewith are substantially reduced.

In a preferred embodiment example it is provided that the at least two central edges—in a top view onto the front side—extend in an arc-shaped manner and in doing so are curved into the associated chip space. The central edges merge here with the adjoining main edges and enclose an angle α in the region of 10°≤α≤30°, preferably <20° together with the adjoining main edges in the junction. This embodiment results in the formation of the chips in the region of the central and main edges in such a way that no peak loads result in the region of the edges that would lead to a disproportionate mechanical and thermal load. Moreover, a homogenous tension profile is achieved in the drill edge, which means that it is loaded with relatively equal forces.

Preferred is an embodiment example of the drill, in which the at least two central edges that extend in an arc-shaped manner merge, via a linear section, with the cross edge and/or with the associated main edge. This embodiment results in a particularly homogenous tension profile or in a very low mechanical and thermal load of the edges.

In a further preferred embodiment example of the drill it is provided that in the junction to the cross edge, the at least two central edges extend at an angle β of 10°≤β≤60°, preferably of 15°≤β≤45°, in relation to an imaginary line that intersects this junction, which line extends parallel to a connection line that connects the junction between the central edge and the adjoining main edge on the one hand and the end of the main edge that faces away from the central edge on the other hand. This embodiment also results in achieving a homogenous tension profile in the edges and in avoiding mechanical and thermal overloads.

A further preferred embodiment example is characterised in that in such a drill, too, the at least two central edges—in a top view onto the front side of the drill—extend in an arc-shaped manner and are curved into the associated chip space.

DESCRIPTION OF THE DRAWINGS

Further embodiments can be seen from the dependent claims.

The invention will now be explained in more detail by means of the attached drawings, wherein.

DETAILED DESCRIPTION

Figure 1:
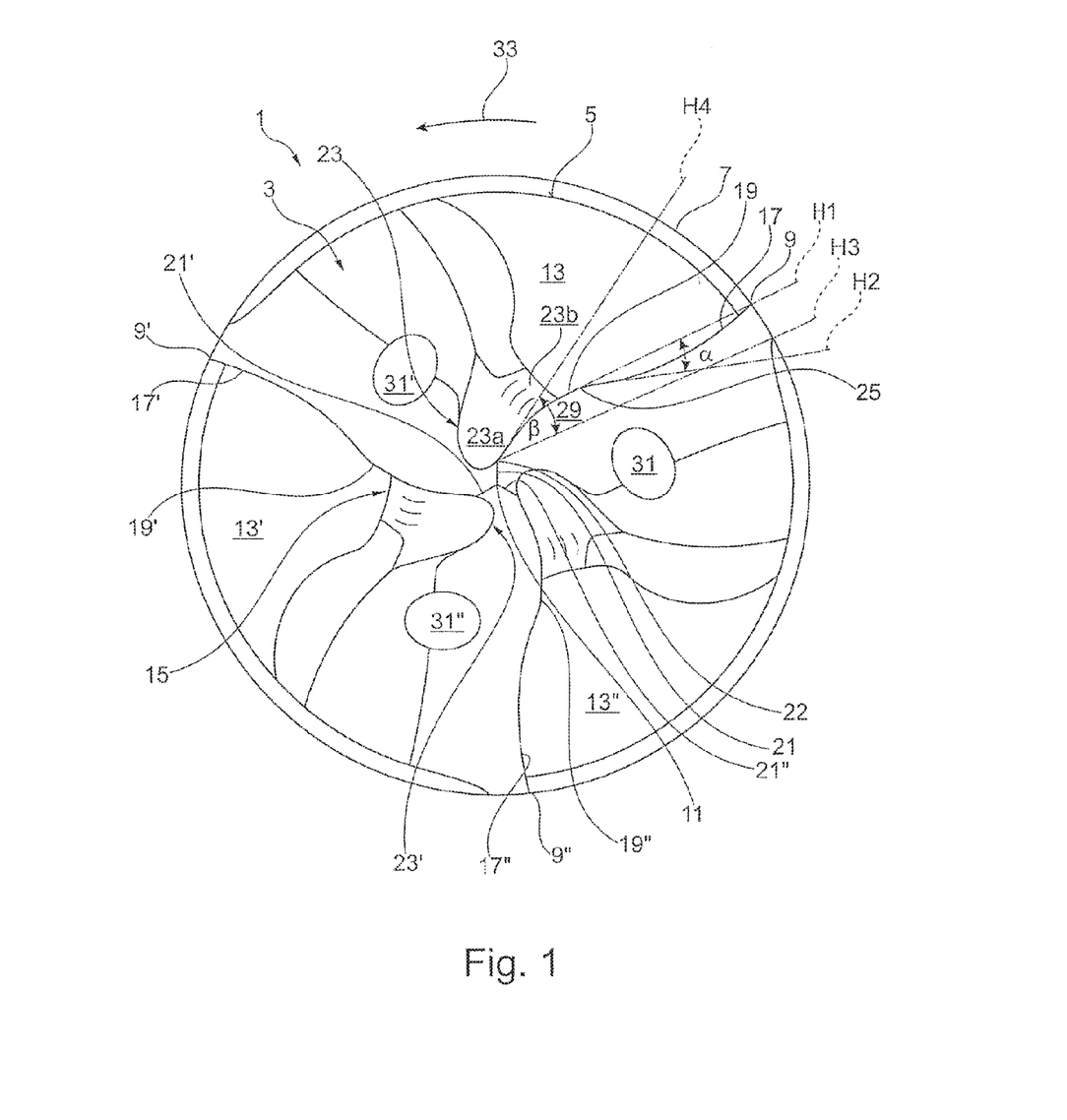
FIG. 1 shows a top view of the front side of a first embodiment example of a drill.

FIG. 1 shows a top view of a first embodiment example of a drill 1, more specifically onto the front side 3 thereof. The drill has a circumferential surface 5. In FIG. 1, the wall of a bore to be processed is indicated with a circle 7. The diameter of the circle 7 corresponds to the diameter of a bore that can be produced by means of the drill 1 shown here.

At least two, here three edges 9, 9' and 9", which are arranged at a distance from each other in the circumferential direction, protrude beyond the circumferential surface 5. In the embodiment example shown here, this is therefore a three-edged drill 1.

During the processing of a bore, the drill 1 as a rule rotates about its central axis 11. In principle, it is also possible to rotate a workpiece relative to a stationary drill in order to produce a bore. Chip flutes 13, 13' and 13" have been introduced into the circumferential surface 5 of the drill 1, through which chip flutes the chips removed from a workpiece by the drill 1 can be carried off. During the production of the chip flutes 13, 13', 13", material is removed for example from the base body of the drill 1, so that a core 15 remains, the diameter of which is significantly smaller than the diameter of the drill 1. In the case of solid carbide drills or in the case of high performance HSS drills, a diameter of the core 15 is usually selected such that it amounts to approx. 25 to 35% of the drill diameter.

The drill 1 has at least two, here three main edges 17, 17' and 17", which are preferably formed to be identical. The main edges extend from that end that is furthest away from the central axis 11 thereof, in which the main edges 17, 17', 17" merge with secondary edges which are in short referred to here as edges 9, 9', 9", and extend inwards in the direction of the core 15 up to the associated at least two, here three central edges 19, 19', 19", which merge at their inner end, i.e. at the end that is closest to the central axis 11 thereof, with at least one, here with three cross edges. In this context, the central edge 19 has associated therewith the cross edge 21, the central edge 19' has associated therewith the cross edge 21' and the central edge 19" has associated therewith the cross edge 21". The three cross edges meet in the central axis 11 of the drill 1 that forms the rotary axis of the drill 1.

The drill 1 is provided with a point thinning. Such point thinnings are known, so that only the following will be explained below in this respect:

Indentations are introduced into the front side 3 of the drill, preferably by grinding, where material of the base body of the drill 1 is removed. The indentations are provided at least in the region of the central edges 19, 19' and 19". They may also extend up to the main edges 17, 17', 17". All the indentations are designed to be identical, so that only the indentation 23 will be addressed here.

Each indentation 23 introduced into the front side 3 for realising the point thinning has a first region 23a that is followed by a second region 23b. In this connection it is provided that the first region 23a is inclined, starting from the front side 3, at a greater angle relative to the central axis 11 than this is the case with the second region 23b of the indentation 23. This will be explained in more detail below. Moreover it is provided that the first region 23a preferably constantly merges with the second region 23b, with a curved region being provided in the junction region, which is formed to be convex.

In the embodiment example shown here merely as an example, the main edge 17 is formed to be curved in such a way that it is concave. By contrast, the central edge 19 is formed in an arc-shaped manner in such a way that it is curved into the associated chip space. As mentioned above, the central edge 19 extends from the main edge 17 up to the cross edge 21. The embodiment explained here applies to all of the three cutting regions of the drill 1, which are designed to be identical.

In FIG. 1, a first imaginary line is drawn, the auxiliary line H1, which connects the junction 25 between the main edge 17 and the central edge 19 with the end of the main edge 17 that faces away from the central edge 19, in which the edge 9 is provided. The first auxiliary line H1 forms the tangent of the central edge 19 in the junction 25. A second imaginary line, the second auxiliary line H2, forms the tangent on the main edge 17 in the region of the junction 25 to the central edge 19. The two auxiliary lines H1 and H2 and thus the central and the main edges enclose an angle α in the junction 25, which has a value of 0°≤α≤30°, preferably of α<20°.

Particularly preferably, the drill 1 is designed in such a way that the central edge 19 realised by the point thinning is arc-shaped and in particular constantly merges with the associated main edge 17, wherein this constant extension of the overall edge from the central edge 19 and the main edge 17 results in a homogenous tension profile in the drill edge, which means that any mechanically and thermally disproportionately loaded edge regions are avoided.

A further imaginary line, the auxiliary line H3, extends parallel to the first imaginary line H1 and intersects the junction 27 between the central edge 19 and the associated cross edge 21. From the junction 27, a tangent is drawn here at the region of the central edge 19 that adjoins the junction 27, which is referred to here as the fourth auxiliary line H4.

It can be seen in FIG. 1 that the third and fourth auxiliary lines H3 and H4, i.e. the central edge 19, enclose an angle β with the auxiliary line H3 in the junction 27, which is in a range of 10° to 60°, preferably in a range of 15° to 45°.

The main edge 17 and the central edge 19 are followed by associated cutting surfaces that fall away into the image plane of FIG. 1 and are obscured in the top view onto the front side 3 of the drill 1. During use of the drill 1, chips are removed from the bottom of a bore by the main edge 17, the central edge 19 and the cross edge 21, and the chips removed by the main edge 17 and the central edge 19 run off along the obscured cutting surfaces down into the image plane of FIG. 1 and are carried off via the chip flutes 13.

The chips running off from the central edge 19 flow along the obscured cutting surface into the image plane of FIG. 1 and, in their further course, impinge on the first region 23a and the second region 23b of the indentation 23 that forms a chip run-off shoulder for the chips removed from the central edge 19.

The cutting surface of the central edge 19 merges, via a concavely curved region, into the chip run-off shoulder, i.e. into the first and second regions 23a, 23b of the indentation 23. Preferably, the concave region is designed in the shape of a circular arc.

The region of the front side 3 that adjoins the main edge 17 and the central edge 19, forms the open area 29 of these edges. This encloses a cutting angle with the cutting surfaces of the main edge 17 or the central edge 19. In this context it is provided in the embodiment example shown here that the cutting angle, at least in the region of the central edge 19, becomes increasingly positive as the distance from the central axis 11 increases, preferably constantly, outwards in the direction of the circumferential surface 5. In this connection, in the region of the central edge 19 that immediately follows the cross edge 21, a negative cutting angle is provided, whereas in the region of the central edge 19 that is located further outwards, a positive cutting angle is realised. Preferably, it may also be provided in relation to the main edge 17 for the cutting angle to become, proceeding from the junction 25 up to the edge 9, i.e. from the inside outwards, preferably constantly, increasingly positive. Thus, the central and the main edges become more and more easy-cutting if viewed from the inside outwards.

Particularly preferably it is provided that the central edge 19 is arc-shaped and in particular constantly merges with the main edge, so that a homogenous tension profile is realised in the edges of the drill 1. Moreover, any exposed edge points are avoided that would cause a disproportionate mechanical and thermal load during the processing of a bore.

In the front side 3 of the drill 1, cooling/lubricating channels open, of which the associated openings 31, 31', 31" can be seen. These openings are used to deliver coolant/lubricant whilst, during the processing of a bore, the drill 1 rotates in the counterclockwise direction as indicated by an arrow 33. Any coolant/lubricant exiting from the opening 31 thus reaches the main edge 17" as well as the associated central edge 19". The same applies to the remaining openings.

Figure 2:
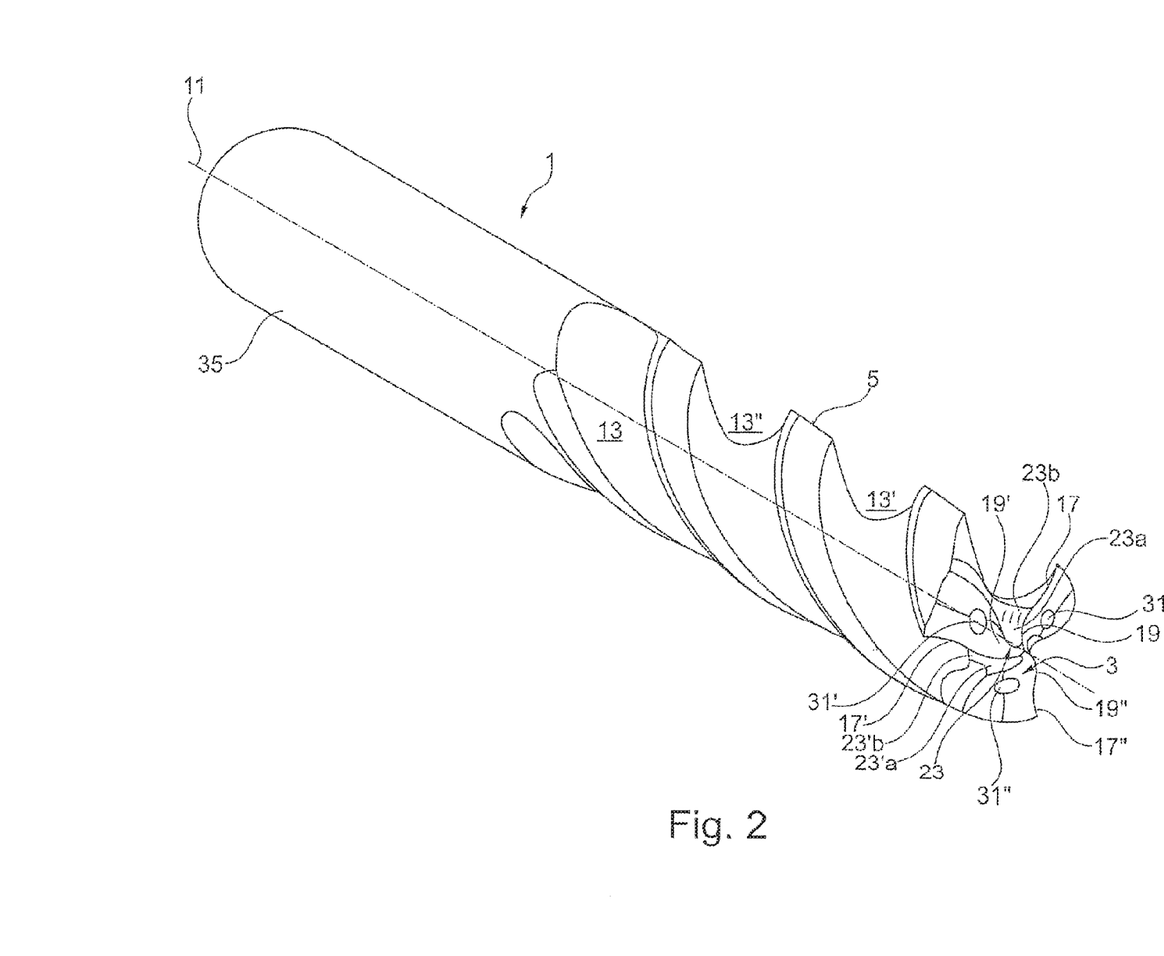
FIG. 2 shows a perspective view of the drill shown in FIG. 1.

FIG. 2 shows the drill 1 shown in FIG. 1 in a perspective view. Same and functionally identical parts have been provided with identical reference numerals, so that reference is made to the description of FIG. 1 in relation thereto.

The drill 1, the front side 3 of which is shown in FIG. 1, has on the side facing away from the front side 3 for example a shaft 35, via which the drill 1 can be coupled to a receptacle, which may be a drilling machine or a machine tool in the widest sense, an adapter or the like. Via the receptacle, a torque is as a rule introduced into the drill, in order to rotate the latter. Into the circumferential surface 5 of the drill 1, at least two, here three chip flutes are introduced which are associated with the edges introduced into the front side 3 of the drill 1 and which form the chip spaces, in which the chips removed from the edges arrive so as to be carried off.

In FIG. 2, the chip space realised by the chip flute 13', which is associated with the main edge 17' and the central edge 19', can be seen particularly clearly, but also the chip spaces that are associated with the main edges 17 and 17" as well as the central edges 19 and 19" and that are realised by the chip flutes 13 and 13".

What can be clearly seen are the indentations 23 in the front side 3 of the drill, which are effected by the point thinning and which comprise a first region 23a and a second region 23b. The regions 23a and 23b form the chip run-up shoulders of the associated edge, here the central edge 19.

Correspondingly, the edges 23'a and 23'b form the run-up shoulders of the central edge 19'. This means that the chips removed by the central edge 19' during the processing of a workpiece using the drill 1 described here, run off on the cutting surface associated with the central edge 19', which is obscured in FIG. 2, and thus arrive at the regions 23'a and 23'b and are steered into the chip flute 13' via these regions or the run-up shoulders.

All of the edges, indentations and chip spaces are designed to be identical, so that any explanation in relation to any one of the edges or indentations and chip spaces equally apply to all of the other edges, indentations and chip spaces.

Figure 3:
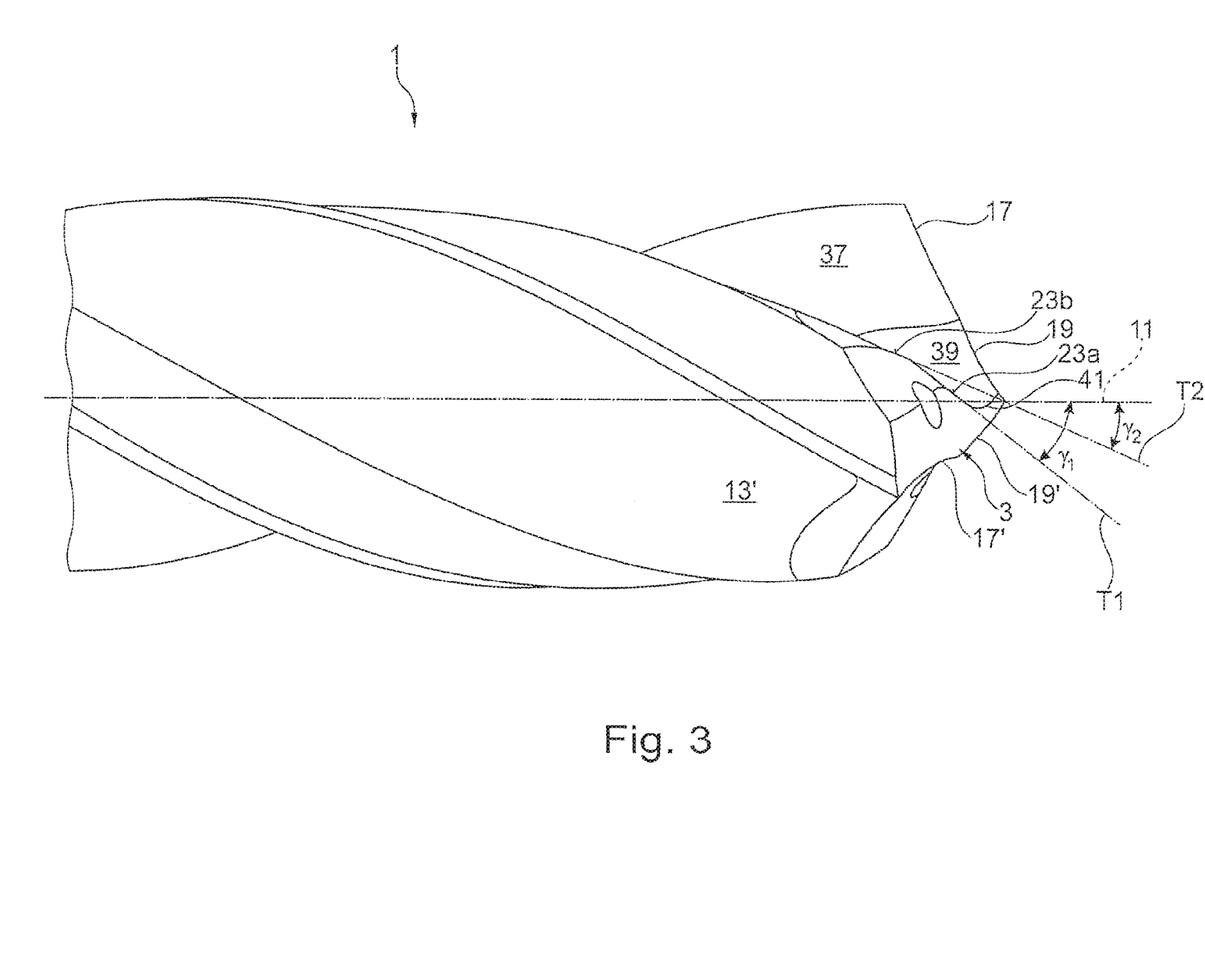
FIG. 3 shows a lateral view of the broken-off front end of the drill according to FIG. 1.

FIG. 3 shows a lateral view of the drill 1, of which however only the broken-off front end is shown here. Same parts with identical functions have been provided with identical reference numerals, so that reference is made here to the preceding description in this respect.

The course of the point thinning will be explained in more detail with reference to FIG. 3, which point thinning is introduced into the front side 3 of the drill 1 and results in the indentation 23 in the region of the central edge 19 and in the remaining indentations associated with the other edges.

The indentations can be seen from the frontal view according to FIG. 1. It was shown there that the indentation 23 has a first region 23a and a second region 23b, which first region 23a is located closer to the front side 3 of the drill 1 than the subsequent second region 23b.

FIG. 3 shows a first tangent T1 on the first region 23a and a second tangent T2 on the second region 23b.

The first tangent T1 is inclined at an angle $\gamma 1$, also referred to as an axial angle, in the axial direction of the drill 1 in relation to the central axis 11 in an axial direction, whereas the second tangent T2 is inclined at an angle $\gamma 2$ in the axial direction of the drill 1 in relation to the central axis 11.

It can be seen from FIG. 3 that the angle $\gamma 1$ is greater than the angle $\gamma 2$. This means that the drill 1 is designed in such a way that the first region 23a, which forms the chip run-up shoulder for the region of the central edge 19 that is close to the centre, is more steeply inclined than the second region 23b forming the chip run-up shoulder for the region of the central edge 19 that is further away from the centre. This means that the angle of the chip run-up shoulder that is formed by the regions 23a and 23b decreases as the distance from the front side 3 increases. This means that the point thinning located close to the central axis 11 is formed with a relatively great axial angle $\gamma 1$. The angle $\gamma$ decreases more and more as the distance from the front side 3 increases, so that in the second region 23b, the angle $\gamma 2$ is obtained. As the distance from the front side 3 increases, the axial angle of the point thinning approaches the angle of twist of the part of the chip flute 13 forming the chip space, which is tangent to the second region 23b at the diameter of the core 15. This means that the chip space created thereby is, proceeding from the central axis 11 of the drill 1, designed to be particularly streamlined, so that the chips removed by the edges, in particular here the central edges 19, arrive at the chip space 13 in a particularly streamlined manner, with very little frictional force being present.

Apart from the main edge 17' and the central edge 19', FIG. 3 also shows the main edge 17 and the central edge 19. In the lateral view shown here, also the cutting surface 37 associated with the main edge 17 and the cutting surface 39 associated with the central edge 19 can be seen. On these cutting surfaces, the chips removed by the main edge 17 and the central edge 19 run off and in this way arrive at the chip space 13 associated with these edges, and the chips removed by the central edge 19 run off from the cutting surface 39 and run up against the chip run-up shoulders formed by the point thinning or the regions 23a and 23b. FIG. 3 also shows that the cutting surface 39 of the central edge 19 merges with the regions 23a and 23b forming the chip run, namely via a curved, concave region 41 that is preferably designed in the shape of a circular arc.

Figure 4:
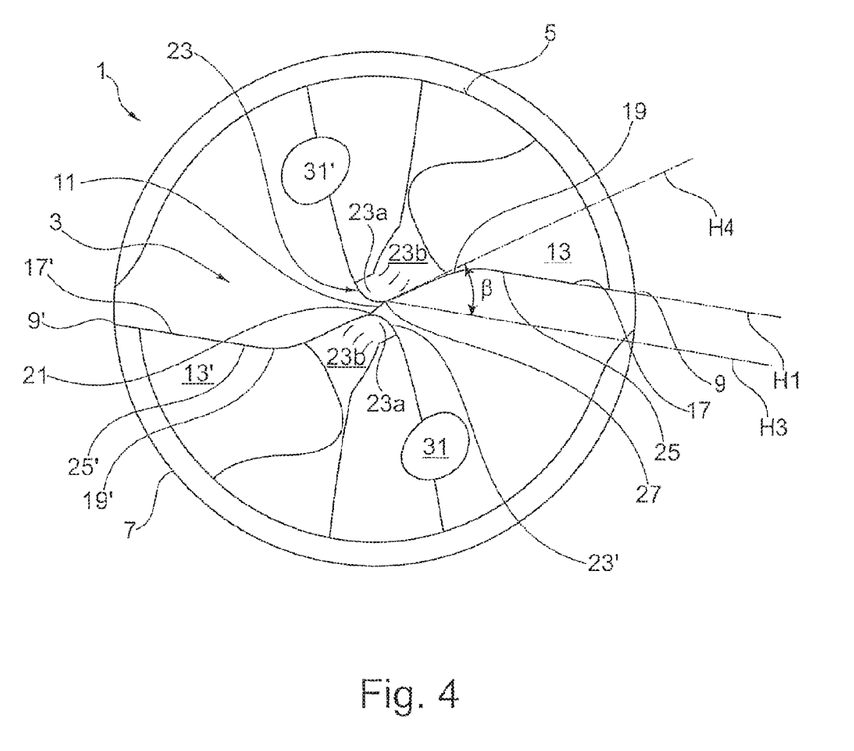
FIG. 4 shows a top view of the front side of a second embodiment example of a drill.

FIG. 4 shows a second embodiment example of a drill 1 in a top view onto the front side 3 thereof. Same parts with identical functions have been provided with identical reference numerals, so that reference is made to the preceding description in this respect.

Figure 5:
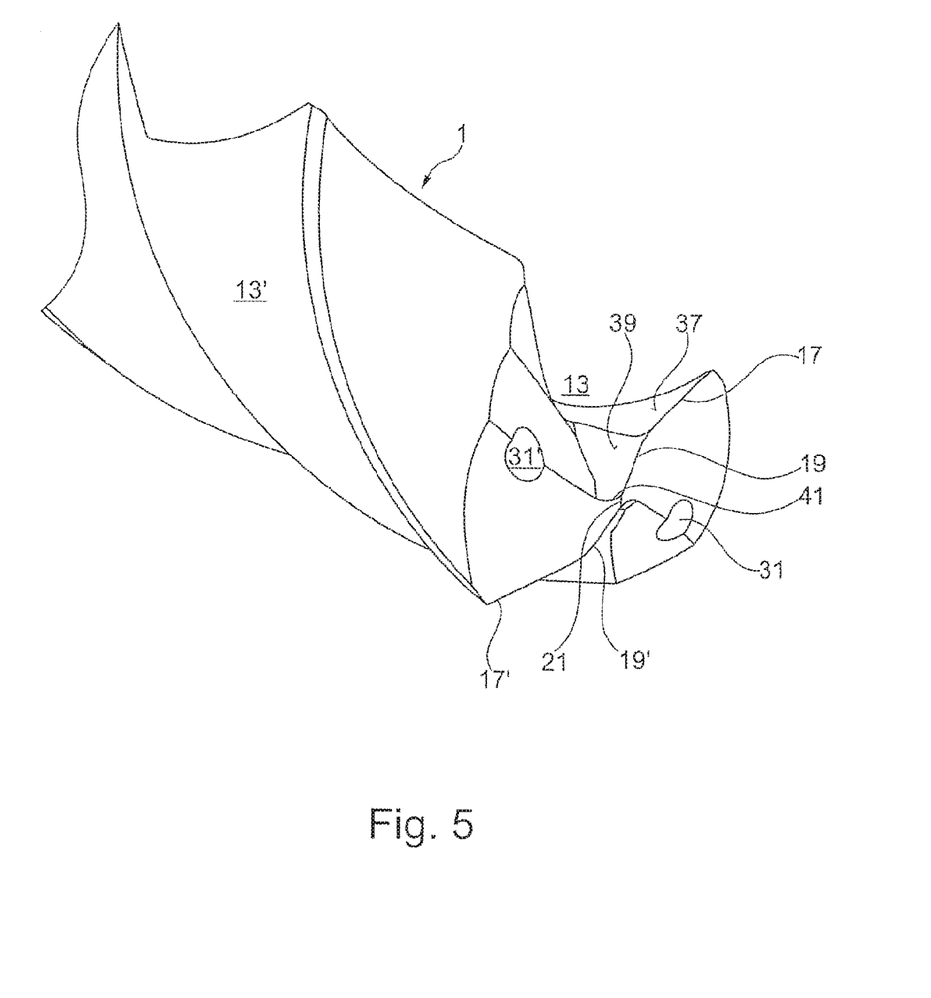
FIG. 5 shows a perspective view of the broken-off front end of the drill according to FIG. 4.

In essence, only the differences between the two embodiment examples will be addressed here:

The embodiment example of the drill 1 as shown in FIGS. 1 and 3 is designed as a three-edged cutter. The embodiment example of the drill 1 as shown in FIGS. 4 and 5 only has two cutting regions. The drill 1 shown in FIG. 4 has a circumferential surface 5, beyond which too edges 9 and 9' protrude here. It has two main edges 17 and 17' which proceed on the outside from the edges 9, 9' of the secondary edges and extend up to the associated central edges 19, 19' that were generated by a point thinning. To this end, indentations 23 and 23' were introduced into the front side 3 of the drill 1 in a known manner, which are identically designed and each of which have a first region 23a and a second region 23b or 23'a, 23'b. These regions, which preferably continuously merge with each other, form the chip run-up shoulders for the chips removed from the central edges 19, 19'. Preferably, the junction between the regions is here again designed to be curved, namely convex.

The two central edges 19, 19' each merge with a cross edge 21 that intersects the central axis 11 of the drill 1.

In FIG. 4, reference numeral 25 identifies the junction between the main edge 17 and the central edge 19. Since the drill 1 is formed point-symmetrically relative to the central axis 11, the further edges 17' and 19', which also have a junction 25', will not be addressed here.

Proceeding from the junction 25, an auxiliary line H1 that connects the junction 25 with the edge 9 has been drawn. In the embodiment example shown here, the main edge 17 is formed to be rectilinear and not curved as is the case in the embodiment example according to FIG. 1. This means it coincides with the auxiliary line H1, so that the angle α as explained with reference to FIG. 1 has the value 0°, because the auxiliary line H2 shown in FIG. 1 also coincides with the auxiliary line H1.

Preferably, as is the case in the first embodiment example, it is also provided in the second embodiment example shown here that the central edge 19 is arc-shaped and in particular constantly merges with the main edge, in order to ensure the above-addressed homogenous tension profile in the drill edge and in order to avoid regions in the edges with a disproportionate mechanical and thermal loading.

FIG. 4 shows a third auxiliary line H3 parallel to the first auxiliary line H1, which intersects the junction 27 of the central edge 19 into the cross edge 21. In FIG. 4, a tangent on the central edge 19 directly on the junction 27 is drawn as an auxiliary line H4, as is also the case in FIG. 1. The two auxiliary lines H4 and H3 enclose an angle β. This means that the central edge 19 merges with the cross edge 21 in the junction region 27 at this angle β, which is selected to be in a range of 10° to 60°, preferably in a range of 15° to 45°.

The embodiment example of the drill 1 as shown in FIG. 4 also has openings 31 and 31', through which coolant/lubricant can exit.

The cutting surfaces associated with the main edge 17 and the central edge 19 extend into the image plane of FIG. 4, so that they are obscured here.

The chips running off from the central edge 19 onto the associated cutting surface run up against the associated chip run-up surfaces formed by the regions 23a and 23b of the indentation 23, i.e. through the point thinning of the drill 1. Preferably, it is provided here, too, that a concavely curved section is present in the junction between the cutting surface and the chip run-up surfaces, which is preferably designed in the shape of a circular arc.

In the embodiment example shown in FIG. 4, as in the case of the drill according to FIGS. 1 to 3, it applies that the two regions 23a and 23b are designed to be inclined in the axial direction in relation to the central axis 11, with the axial angle being relatively large in the vicinity of the front side and decreasing as the distance from the front side 3 increases. It is preferably provided that this axial angle constantly decreases and finally approaches the angle of twist of the chip flute 13 realising the chip space. This means that this, too, results in the circumstances shown in FIG. 3, wherein the axial angle in FIG. 3 is referred to as γ1 and γ2. In this respect, γ1 corresponds to the angle of inclination of the first region 23a relative to the central axis 11 and γ2 corresponds to the angle of inclination of the second region 23b of the indentation 23, which is further away from the front side 3, wherein, as mentioned above, the two regions 23a and 23b form the run-up shoulder for the chips removed by the central edge 19.

Finally, FIG. 5 shows a perspective view of the broken-off front end of the second embodiment example of the drill 1 according to FIG. 4. Same parts with identical functions have been provided with identical reference numerals, so that reference is made to the preceding description in this respect.

In the view according to FIG. 5, the drill 1 has been turned in such a way that the cutting surfaces 37 and 39 associated with the main edge 17 and the central edge 19 can be clearly seen. Here, too, the concavely curved region 41 can be seen, via which the cutting surface 39 of the central edge 19 merges with the associated chip run-up shoulders, i.e. with the regions 23a and 23b. Preferably, the region 41 is designed in the shape of a circular arc.

Reference is made again to the fact that in the second embodiment example of the drill 1, the two cutting regions are identically formed, so that what was said in relation to the first edges (main edge 17, central edge 19) also applies to the second edges (main edge 17', central edge 19'). Correspondingly, it has to be said in relation to the drill 1 designed as a three-edge cutter according to FIGS. 1 to 3, that here, too, the cutting regions are designed to be identical, as well as the associated point thinnings, chip run-up surfaces, cutting surfaces as well as chip spaces.

Apart from that, it is expressly pointed out here that the drill described here is characterised by the special design of the point thinning which on the one hand has an indentation 23 with two regions 23a and 23b which, if viewed in the axial direction of the drill, are inclined differently. The angle of these regions decreases as the distance from the front side 3 increases, as was explained in detail above.

On the one hand, the point thinning is designed in such a way that the at least central edge 19 of the drill 1 is formed to be curved, i.e. convex, and preferably merges with the main edge 17 uniformly, in particular constantly, in the form of an arc. In this respect, the main edge 17 may be formed to be concave, as was described with reference to the first embodiment example, or in a rectilinear form, as was explained with reference to the second embodiment example. In particular, a rectilinear main edge 17 is preferred in the case of a two-edged drill.

The two features of the special point thinning as described here may be realised independently from each other on a drill 1. However, it would also be possible to combine these two embodiments, which are based on the point thinning, with each other.

Apart from that, what both embodiment examples of the drills moreover have in common is that the convexly curved, arc-shaped central edge 19 may have rectilinear sections in the end regions thereof, in which it merges with the main edge 17 on the one hand and with the cross edge 21 on the other hand. This embodiment contributes towards securely avoiding any special mechanically and/or thermally loaded edge regions.

What is essential is that in both embodiment examples of the drill, the point thinning, i.e. the indentation 23 and the regions 23a and 23b forming the chip run-up surfaces thereof, are designed such that during the processing of a bore by means of the drill described here, the chips are optimally guided into the chip flutes 13, 13' and 13" forming the chip spaces, and the chips are particularly well carried off, in particular in the regions facing the central axis 11. It has been found that any friction is minimised here without any loss in terms of chip formation having to be borne.

What is also important is that the depth of the point thinning is kept so minimal that also drills having more than two edges may be realised, as is provided in the first embodiment example. An increase of the number of edges, which means here to three edges, also allows higher feed rates per revolution and results in substantially improved bore qualities. In this respect, the position accuracy is increased and the burr formation both on the bore entrance and the bore exit is substantially reduced. It has also been shown that tools with a larger number of edges are substantially superior to two-edged drills in the case of cutting interruptions.

The invention claimed is:

1. A drill comprising:
   a central axis;
   a front side;
   a circumferential surface;
   at least two main edges provided on the front side, which reach up to the circumferential surface and merge there with associated secondary edges;
   at least two central edges that follow on from an end of the main edge that faces away from the circumferential surface;
   cutting surfaces associated with the at least two main edges and the at least two central edges;
   chip flutes associated with the at least two main edges as well as the at least two central edges and introduced into the circumferential surface;
   at least one cross edge that adjoins ends of the at least two central edges that face away from the at least two main edges and that passes through the central axis;
   a point thinning; and
   chip run-up shoulders associated with at least the cutting surfaces of the at least two central edges;
   wherein an angle $\gamma$ of the chip run-up shoulder continuously decreases in a region of the point thinning towards the central axis as a distance from the front side increases.

2. The drill as claimed in claim 1, wherein the chip run-up shoulder has two regions that merge with each other in an arc-shaped manner.

3. The drill as claimed in claim 1, wherein the at least two central edges extend, if viewed in a top view onto the front side, in an arc-shaped manner and are curved into an associated chip space, and merge with an adjoining main edges under an angle $\alpha$;
   wherein the at least two central edges enclose the angle $\alpha$ with the adjoining main edges in a junction that falls into a range of $10° \leq \alpha \leq 30°$ such that the angle $\alpha$ is defined between a tangent line at a point on the central edge, with respect to another tangent line at a point on the main edge, in the region of the junction between the central edge and the main edge, when the drill is viewed at an end view facing a tip end of the drill.

4. The drill as claimed in claim 3, wherein the at least two central edges enclose the angle $\alpha$ with the adjoining main edges in the junction that falls into a range of $\alpha < 20°$.

5. The drill as claimed in claim 3, wherein the at least two central edges merge with the cross edge and/or with an associated main edge via a rectilinear section.

6. The drill as claimed in claim 3, wherein the at least two central edges extend in the junction to the at least one cross edge at an angle $\beta$ of 10° to 60°, relative to an imaginary line that runs parallel to a connection line that connects the junction between the central edge and the adjoining main edge with the end of the main edge that faces away from the central edge, wherein the imaginary line extends through the junction between the cross edge and the central edge.

7. The drill as claimed in claim 6, wherein the angle $\beta$ is 15° to 45°.

8. The drill as claimed in claim 3, wherein the drill includes three central edges, and angle $\alpha < 20°$.

9. The drill as claimed in claim 1, wherein the cutting surfaces of the at least two central edges merge with the chip run-up shoulders.

10. The drill as claimed in claim 9, wherein a junction between the cutting surfaces and the chip run-up shoulders is formed to be in the shape of an arc.

11. The drill as claimed in claim 9, wherein a junction between the cutting surfaces and the chip run-up shoulders is formed to be concave.

12. The drill as claimed in claim 1, wherein a cutting angle becomes increasingly positive at least in the region of the at least two central edges as a distance from the central axis outwards toward the circumferential surface increases.

13. The drill as claimed in claim 1, wherein the drill has two or three central edges with adjoining main edges.

14. The drill as claimed in claim 1, wherein the chip run-up shoulder in a first region is more steeply inclined than in a second region, the first region located closer to the front side.

15. The drill as claimed in claim 14, wherein an axial angle of the point thinning approaches an angle of twist of the chip flute tangent to the second region.

16. The drill as claimed in claim 1, wherein the point thinning is formed with a greater angle of the point thinning region measured with respect to a central axis of this drill closer to the central axis.

* * * * *